United States Patent
Sloan et al.

(10) Patent No.: US 6,826,346 B2
(45) Date of Patent: Nov. 30, 2004

(54) SYSTEM AND METHOD FOR PROTECTING A FIBER OPTIC CABLE CONNECTOR TIP

(75) Inventors: Robert C. Sloan, Georgetown, TX (US); Mark S. Manley, Leander, TX (US); Roy A. Rachui, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 10/370,163

(22) Filed: Feb. 19, 2003

(65) Prior Publication Data

US 2004/0161218 A1 Aug. 19, 2004

(51) Int. Cl.[7] .............................. G02B 6/00; G02B 6/44
(52) U.S. Cl. ....................................... 385/136; 385/137
(58) Field of Search ............................... 385/54–56, 58, 385/62, 70, 76, 77, 81, 87, 134, 135, 147; 138/89

(56) References Cited

U.S. PATENT DOCUMENTS

| | | | |
|---|---|---|---|
| 4,448,481 A | * | 5/1984 | Basov et al. ................ 385/136 |
| 5,967,189 A | * | 10/1999 | Cheng .......................... 138/89 |
| 6,400,875 B1 | | 6/2002 | Lincoln et al. .............. 385/115 |
| 6,516,129 B2 | | 2/2003 | Chan et al. .................. 385/134 |
| 2003/0108302 A1 | * | 6/2003 | Chang .......................... 385/76 |

* cited by examiner

*Primary Examiner*—John R. Lee
*Assistant Examiner*—Christopher M. Kalivoda
(74) *Attorney, Agent, or Firm*—Hamilton & Terrile, LLP; Robert W. Holland

(57) ABSTRACT

Connector tips for paired fiber optic strands are protected from damage by a tip protector held in position with one or more flexible members that are disposed to cover the connector tips with the tip protector in an unflexed position and to flex to expose the connector tips by moving the tip protector. The flexible members, such as a pair of extension springs, are coupled to the paired fiber optic strands with a clamp that holds the flexible members on opposing sides of and parallel with the fiber optic strands to provide structural support to the fiber optic strands. Bending of the flexible members from parallel alignment with the fiber optic strands removes the connector tips from a recess of the tip protector. The flexible members are biased to return to the parallel alignment so that the tip protector is biased to return to a position that covers the connector tips.

20 Claims, 3 Drawing Sheets

SYSTEM AND METHOD FOR PROTECTING A FIBER OPTIC CABLE CONNECTOR TIP

BACKGROUND OF THE INVENTION

1. Field of the Invention

The present invention relates in general to the field of protection of connectors from damage, and more particularly relates to a system and method for protecting a fiber optic cable connector tip.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically communicate information with other information handling systems through networks, such as local area networks ("LAN"), wide area networks ("WAN") and public networks like the Public Switched Telephone Network ("PSTN"). A variety of network connections are available to interface information handling systems with networks at a variety of speeds. For instance, phone jacks are commonly used to connect information handling systems to the Internet through the PSTN such as with a dial-up modem or DSL modem. As another example, Ethernet connections are commonly used to connect information handling systems to LANs or to high speed external modems, such as cable modems, for communication with server information handling systems. Although phone jack and Ethernet connections provide for rapid exchanges of information, as information handling systems grow in capability, even greater rates of transmission are often used to communicate information between information handling systems.

One type of network connection that offers rapid information transmission is a fiber optic network connection. Fiber optic transmission mediums are made of glass that transmits information as light signals. Fiber optic transmission media are becoming increasingly common with information handling systems that communicate large quantities of information at high transmission rates, such as server information handling systems. Although fiber optic network connections provide rapid information transmission rates, the glass medium found in fiber optic network connections is typically much less robust than copper wire based transmission media and thus more susceptible to breakage. For instance, a common configuration for communicating information from an information handling system is to have paired optic strands terminating with a pair of optic connectors. The pair of optic strands may extend from an information handling system or be inserted into connectors of an information handling system. Both the connector tips and the optic strands themselves are susceptible to damage when information handling systems are moved since even slight impacts against hard objects can produce breakage in the fiber optic media that results in failure of the fiber optic network connection. Plastic caps are sometimes used to cover fiber optic connectors, however, such plastic caps are easily lost and provide little protection to the fiber optic strands.

SUMMARY OF THE INVENTION

Therefore a need has arisen for a system and method which protects unconnected fiber optic media and connection tips from impact damage in a readily available and convenient manner.

In accordance with the present invention, a system and method are provided which reduces the problems and difficulties associated with previously known systems and methods for protecting fiber optic media and connection tips from impact damage. Flexible members coupled to a fiber optic medium bias a tip protector to cover the connector tips of the fiber optic media and flex to move the tip protector to expose the connector tips for connection of the tips to another connection point. The flexible members align parallel to the fiber optic medium in an unflexed position to support the medium and reduce the risk of breakage.

More specifically, a tip protector made of polycarbonate is formed to have a recess that accepts the connector tips of a fiber optic cable, such as a pair of fiber optic strands. The tip protector couples with first and second extension springs aligned parallel with the fiber optic cable so that in an unflexed position the extension springs maintain the tip protector over the connector tips. The extension springs are coupled to the fiber optic cable with a clamp that couples to the fiber optic cable at an adjustable distance from the connector tips. The clamp couples over the pair of fiber optic strands with opposing members having aligned cable recesses and couples over the extension springs with opposing spring recesses of each member. The extension springs align parallel on opposing sides of the fiber optic cable to lend structural support to the fiber optic cable. The extension springs flex to allow exposure of the connector tips by removing the connector tips from the recess of the tip protector and bias the tip protector to return to a position that covers the connector tips.

The present invention provides a number of important technical advantages. One example of an important technical advantage is that a fiber optic medium and its connection tips are protected from impact damage by a tip protector that is biased to cover the connection tips. The flexible extension spring members allow convenient exposure of the connection tips of the fiber optic cable by flexing to move the tip protector from a protective position disposed over the connection tips to an exposed position offset from the connection tips. The clamp secures the extension springs to the fiber optic cable so that the tip protector remains available to return to the protective position. Further, the clamp maintains the extension springs when unflexed in an alignment parallel with the fiber optic cable to provide support to the cable itself, reducing the risk of cable breakage.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Fiber optic cables, such as paired fiber optic strands, having connector tips that are vulnerable to physical damage are protected with a tip protector that is biased to cover the connector tips with flexible members that allow exposure of the connector tips for connection with information handling systems. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
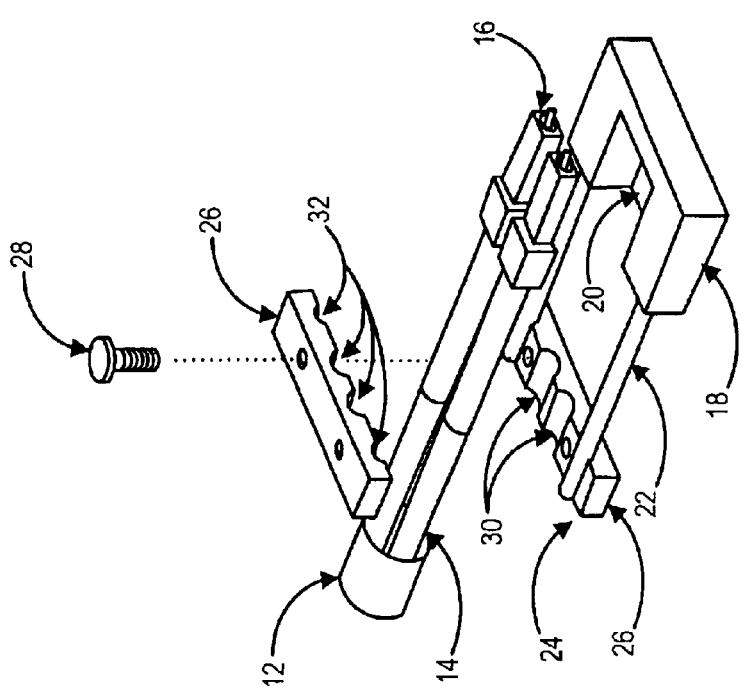
FIG. 1 depicts a blow-up view of a system for protection of a fiber optic cable connector.

Referring now to FIG. 1, a blow-up view is depicted of a system 10 for protection of a fiber optic cable connector tip. A fiber optic cable 12 having a pair of fiber optic strands 14 terminates at a connector tip 16 having a square shape for insertion in a mating connector. Fiber optic cable 12 is composed of a glass material that communicates information with light signals sent to information handling systems through connector tip 16. For instance, fiber optic cable 12 may extend from an information handling system to a network that mates with connector tip 16 or, alternatively, may lead to a network with connector tip 16 adapted to insert into an information handling system.

A tip protector 18 is formed to have a connector tip recess 20 that covers and protects connector tip 16 from impact damage. Connector tip recess 20 is sized to fit connector tip 16 by cutting a portion of material from a block of protective material, such as polycarbonate. In the depicted embodiment, connector tip recess 20 is partially cut through tip protector 18 so that connector tip 16 inserts into recess 20 from one side but is prevented from complete movement through tip protector 18. In an alternative embodiment, connector tip recess 20 is a complete cut through tip protector 18 to allow insertion of connector tip 16 from either side of tip protector 18. Further, additional protective material may be included in connector tip recess 20 to provide a more snug fit and greater protection for connector tip 16.

Tip protector 18 is held in position to cover connector tip 16 with two flexible members 22, such as extension springs, that are glued or screwed into tip protector 18. Flexible members 22 are coupled in a parallel alignment with fiber optic strands 14 by a clamp 24. Clamp 24 has two opposing clamp members 26 that are held together with attachment devices 28, such as screws. Each opposing clamp member 26 has a cable recess 30 for each fiber optic cable strand 14 and a spring recess 32 for each flexible member 22. Clamp 24 secures flexible members 22 to fiber optic cable 12 by aligning cable recesses 30 and spring recesses 32 of opposing clamp members 26 and securing clamp members 26 together with attachment devices 28. Clamp members 26 are formed from a material, such as polycarbonate, that does not interfere with or otherwise damage fiber optic cable 12. In one embodiment, cable recesses 30 and spring recesses 32 are formed with like sizes to allow interchangeable use.

Figure 2:
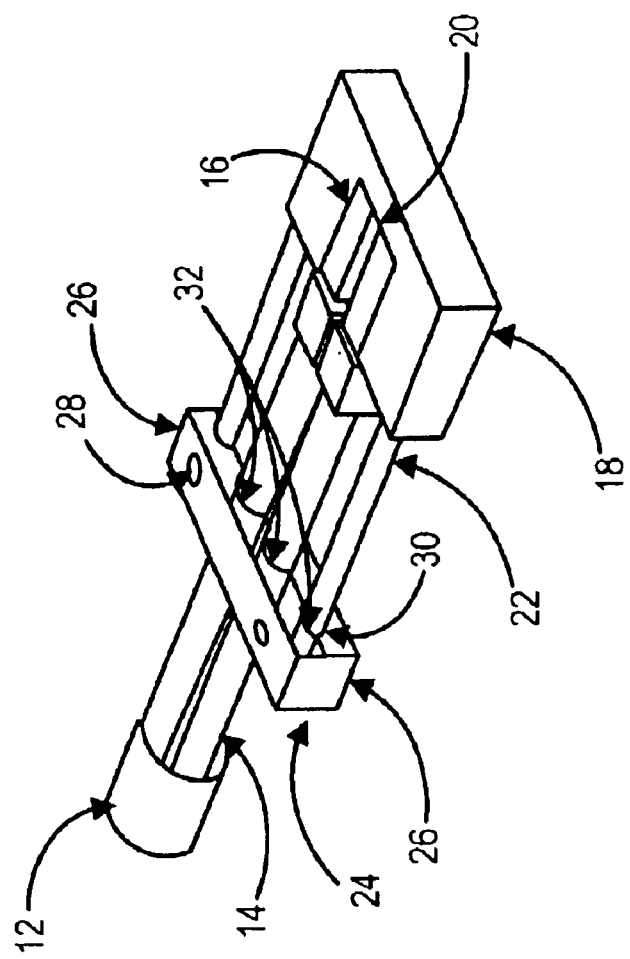
FIG. 2 depicts an assembled system for protection of a fiber optic cable connector.
Figure 3:
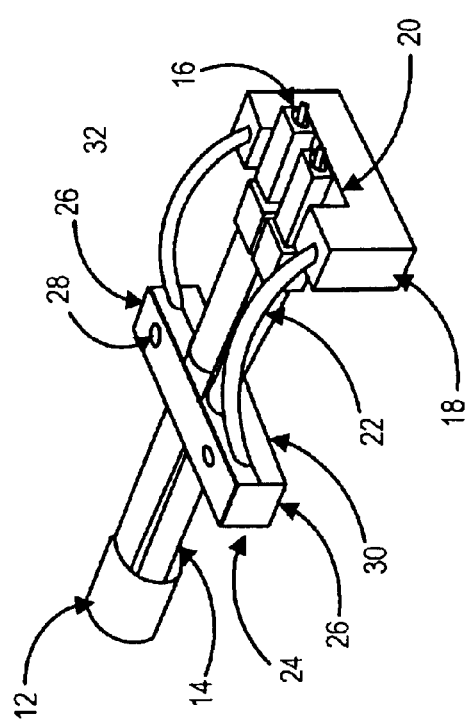
FIG. 3 depicts a system for protection of a fiber optic cable connector configured to expose the connector for interfacing with a connection.

Referring now to FIGS. 2 and 3, the system 10 for protecting fiber optic cable tips from damage is depicted in protective and exposed configurations. FIG. 2 depicts flexible members 22 in an unflexed position that substantially aligns flexible members 22 parallel with fiber optic cable strands 14 to hold tip protector 18 in a protective position with connector tip 16 inserted in recess 20. A flexible member 22 is secured on each of opposing sides of fiber optic cable 12 to provide support to fiber optic cable 12 that reduces the risk of breakage. FIG. 3 depicts flexible members 22 in a flexed position that exposes connector tip 16 by moving tip protector 18 laterally to remove connector tip 16 from recess 20. The exposed connector tip is available for insertion into a corresponding connector, such as a connector of an information handling system or network interface. Flexible members 22 bias tip protector 18 to return to the protective position in which connector tip 16 inserts in recess 20. Thus, for instance, while connector tip 16 is inserted into a corresponding connector, tip protector 18 rests against the corresponding connector. Once connector tip 16 is removed from the corresponding connector, flexible members 22 biases tip protector 18 to return to the protective position without additional action taken by a user of the information handling system.

Although the present invention has been described in detail, it should be understood that various changes, substitutions and alterations can be made hereto without departing from the spirit and scope of the invention as defined by the appended claims.

What is claimed is:

1. A system for protecting a fiber optic cable connector tip from damage, the system comprising:

a clamp operable to couple to the fiber optic cable at an adjustable distance from the connector tip;

an extension spring having first and second ends, the extension spring coupled to the clamp at the first end and aligned substantially parallel with the fiber optic cable to have the second end proximate to the connector tip; and a tip protector having a tip recess shaped to accept the fiber optic cable connector tip, the tip protector coupled to the extension spring second end and operable to cover the fiber optic cable connector tip in an unflexed position and to expose the fiber optic cable connector tip in a flexed position.

2. The system of claim 1 wherein the clamp comprises:

first and second clamp members, each clamp member having a cable recess shaped to accept the fiber optic cable and a spring recess shaped to accept the extension spring; and an attachment device operable to couple together the first and second clamp members with the cable recesses and the spring recesses of each member aligned so that insertion of the fiber optic cable in the cable recesses and the extension spring in the spring recesses couples the extension spring substantially parallel to the fiber optic cable.

3. The system of claim 2 further comprising plural cable recesses in each clamp member to couple with plural fiber optic cables.

4. The system of claim 2 further comprising first and second spring recesses in each clamp member to couple with first and second extension springs, the springs disposed on opposing sides of the cable recesses to aid in support of the cable.

5. The system of claim 2 wherein the spring recesses and clamp recesses have like dimensions to allow interchangeable use of each recess with a fiber optic cable or extension spring.

6. The system of claim 1 wherein the tip recess comprises an opening along one side of the tip protector that allows flexing of the extension spring along a single path to cover or uncover the fiber optic cable connector tip.

7. The system of claim 1 wherein the tip recess comprises an opening through the tip protector that allows flexing of the extension spring along plural paths to cover or uncover the fiber optic cable connector tip.

8. The system of claim 1 wherein the tip protector comprises polycarbonate.

9. The system of claim 1 wherein the clamp comprises polycarbonate.

10. A method for protecting fiber optic cable connector tips from damage, the method comprising:

coupling one or more spring members to the fiber optic cable;

coupling a tip protector to the spring members;

aligning the spring members with fiber optic cable to cover the connector tip with the tip protector with the spring members in an unflexed position; and exposing the connector tip by flexing the spring members.

11. The method of claim 10 further comprising inserting the exposed connector tip into a fiber optic connector.

12. The method of claim 1 further comprising:

removing the connector tip from the fiber optic connector; and allowing the flexed spring member to return to the unflexed position to cover the connector tip with the tip protector.

13. The method of claim 10 wherein the fiber optic cable comprises paired optic strands and aligning the spring members further comprises disposing the paired optic strands between first and second spring members.

14. The method of claim 13 wherein the spring members comprise extension springs.

15. The method of claim 10 wherein exposing the connector tip further comprises bending the spring members to remove the connector tip from the tip protector.

16. A system for protecting paired fiber optic strands, the system comprising:

paired fiber optic strands aligned in a parallel configuration and terminating at an end;

a connector tip coupled to the terminating end of the paired fiber optic strands;

a clamp secured to the paired fiber optic strands distal from the connector tip;

a tip protector disposed proximate the connector tip and operable to protect the connector tip from damage; and a pair of flexible members extending from the clamp to the tip protector, the flexible members disposed in an unflexed position to run parallel with and on opposing sides of the paired fiber optic strands, the flexible members operable to flex to remove the tip protector from the connector tip.

17. The system of claim 16 wherein the flexible members comprise extension springs.

18. The system of claim 16 wherein the clamp comprises:

first and second opposing clamp members, each clamp member having first and second cable recesses disposed to accept the paired optic strands and first and second flexible member recesses disposed to accept the flexible members; and an attachment device operable to secure the first and second clamp members to each other with the paired optic strands in the cable recesses and the flexible members in the flexible member recesses.

19. The system of claim 18 wherein the first and second opposing clamp members comprise polycarbonate.

20. The system of claim 16 wherein the tip protector comprises polycarbonate formed with a recess aligned so that flexing of the flexible member pair from parallel alignment with the paired optic strands to nonparallel alignment removes the connector tip from the recess.

* * * * *